United States Patent [19]

Hancock

[11] 3,923,322
[45] Dec. 2, 1975

[54] TRACTOR HITCH ADAPTER

[75] Inventor: James E. Hancock, Lubbock, Tex.

[73] Assignee: Clark Equipment Company, Buchanan, Mich.

[22] Filed: Aug. 29, 1974

[21] Appl. No.: 501,562

[52] U.S. Cl. .............................. 280/461 A; 172/679
[51] Int. Cl.² ............................................ B60D 1/16
[58] Field of Search ........ 280/490 R, 461, 467, 462, 280/482, 415 A; 172/679, 680, 396

[56] References Cited
UNITED STATES PATENTS

| | | | |
|---|---|---|---|
| 2,446,584 | 8/1948 | Green | 280/467 |
| 2,473,357 | 6/1949 | Blunier | 280/415 A X |
| 3,090,139 | 5/1963 | Hancock | 180/14 X |

Primary Examiner—Leo Friaglia
Assistant Examiner—R. Schrecengost
Attorney, Agent, or Firm—Jack E. Toliver, Esq.

[57] ABSTRACT

A hitch adapter having a linearly adjustable element and an angularly adjustable draft coupling enabling connection to be made for towing an implement, such as an earth moving scraper, with various prime mover hitches, such as a three point hitch and draw bar of an agricultural tractor, where the hitch adapter increases the towing and carrying capacities of the tractor hitch.

7 Claims, 3 Drawing Figures

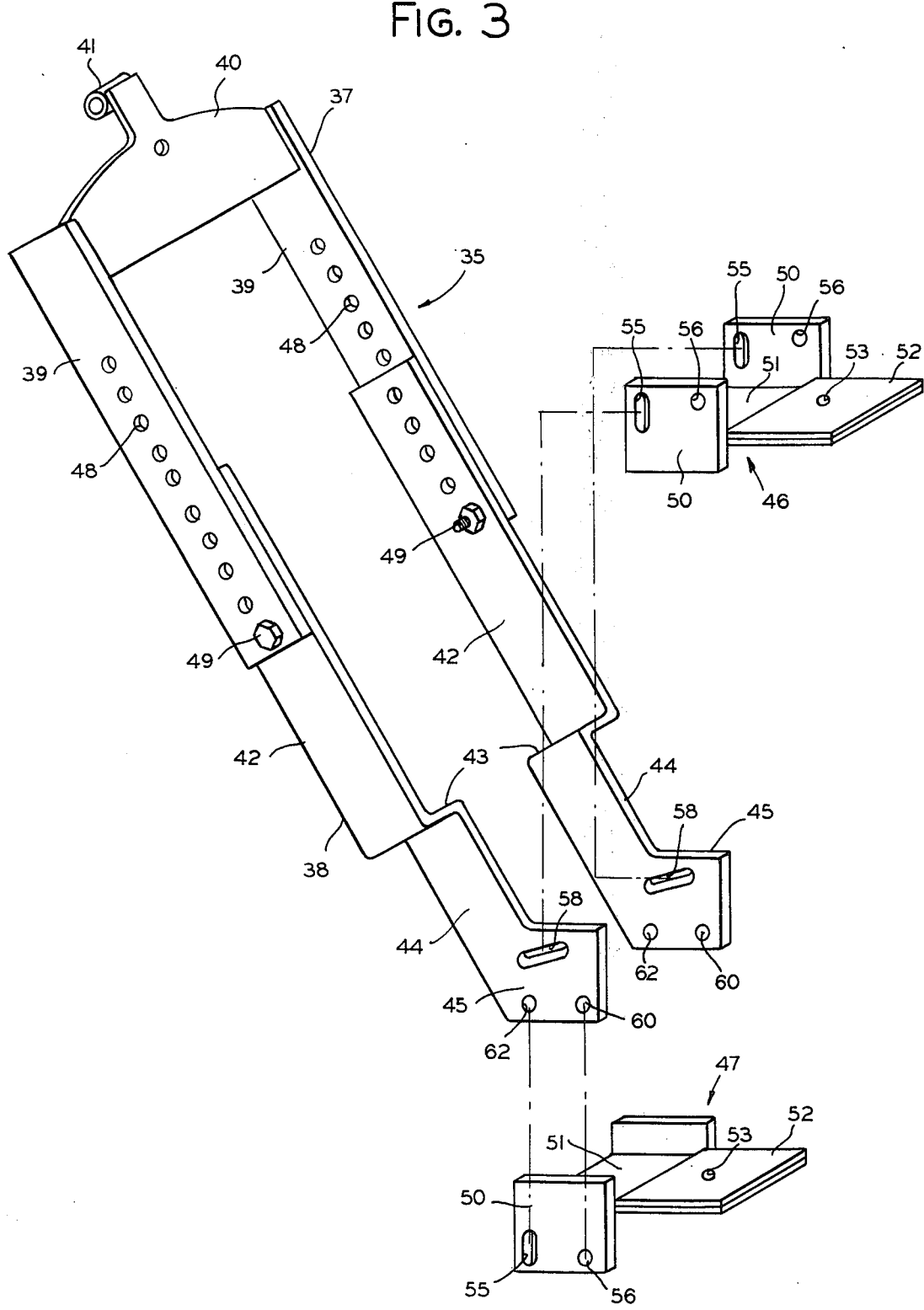

TRACTOR HITCH ADAPTER

BACKGROUND OF THE INVENTION

1. Field of the Invention

The invention pertains to the art of articulated vehicles and more particularly to hitching arrangements therefor.

2. Description of the Prior Art

Earth moving elevating scrapers will, in the case of the so-called utility or small agricultural scraper, often be towed by a conventional farm tractor having a draw bar at the rear and a PTO shaft which may be coupled by a telescoping drive line to a gear box on the scraper for driving the scraper elevator. Such an agricultural scraper unit is disclosed in U.S. Pat. No. 3,090,139 entitled "Two Wheeled Scraper" by J. E. Hancock issued May 21, 1963.

The tractors will also usually have a three point hitch used for towing general agricultural implements, but this hitch is not used for towing a scraper since it does not have the stability or strength for hauling the scraper when fully loaded. The tractor draw bar used for scrapers, while much stronger, even tends to limit the size of the scraper loads.

SUMMARY OF THE INVENTION

To increase stability of the tractor draw bar and provide structural reinforcement, a hitch adapter is fitted on the tractor hitch between upper and lower draft mountings, which in the case of a farm tractor is between the upper arm of the three point hitch and the draw bar. The hitch adapter is provided at the lower end with a coupling forming a draft mounting pivotally supporting a kingpin. The coupling is angularly adjustable to accommodate various tractor hitch geometries.

The hitch adapter will preferably be linearly adjustable between the upper and lower draft mountings. More specifically, upper and lower spaced legs of two yoke sections are in overlapped relationship with the respective legs of the upper yoke section joined to those of the lower by fasteners at various linearly adjustable positions corresponding to the spacing requirements between the upper and lower draft mountings of the tractor hitch.

The lower leg portions will have aligned, longitudinal slots inclined upwardly from the horizontal plane of the lower draft mounting or draw bar. The coupling member will include a bracket element having spaced side plates joined by a web. The side plates have aligned vertical slots intersecting with the inclined slots of the lower leg portions to permit angular adjustment.

Where the hitch adapter is used for towing an elevating scraper on an agricultural or farm tractor having a three point hitch and PTO shaft, the king pin draft connection with the tractor draw bar will be longitudinally adjusted relative to the end of the tractor PTO shaft to the required length for satisfactory operation of the telescoping drive line. This length is established by the optimum extension of the telescoping drive line for the turning movement permitted between the tractor and scraper. The draft coupling of the hitch adapter will be angularly adjusted to maintain a horizontal relationship with the tractor draw bar and the linearly adjustable section will be set to the length required by the position of the upper draft arm of the three point hitch. This is the only draft element of the three point hitch that is used with the adapter.

Another feature of the invention is that the draft coupling has twin or duplicate bracket plates, one above and the other below the draw bar. If one becomes more worn than the other, the adjustment holes of the lower leg portion are interchangeable with either plate whereby the bottom plate can be placed on the top and vice versa.

One of the main aspects of the invention is to provide a hitch adapter for agricultural tractors which uses the tractor three point hitch to provide additional support for the draw bar so that greater loads may be carried.

Another aspect of the invention is the provision of a hitch adapter which can be linearly and angularly adjusted according to the requirements of any hitch geometry.

The objects of the invention include providing a device which structurally couples the upper and lower tractor hitch draft mountings such that appreciably higher draft loads, such as encountered in towing earthmoving scrapers, are more uniformly distributed rather than being completely on the lower draft mounting or draw bar.

Considered among the advantages also is that the hitch adapter will have reversible top and bottom draft coupling elements wherein the top element, which may be subject to the greatest load from the scraper tongue and thus show considerably more wear than the bottom element, is reversed with the element on the bottom so that they wear uniformly increasing the service life of the hitch adapter.

These and other advantages will be more apparent by referring to the following detailed description which proceeds with a description of the drawings wherein:

DESCRIPTION OF THE DRAWINGS

FIG. 3 is a perspective view of the hitch adapter in FIG. 1 showing the top and bottom bracket plates in exploded view.

DESCRIPTION OF THE PREFERRED EMBODIMENT

Figure 1:
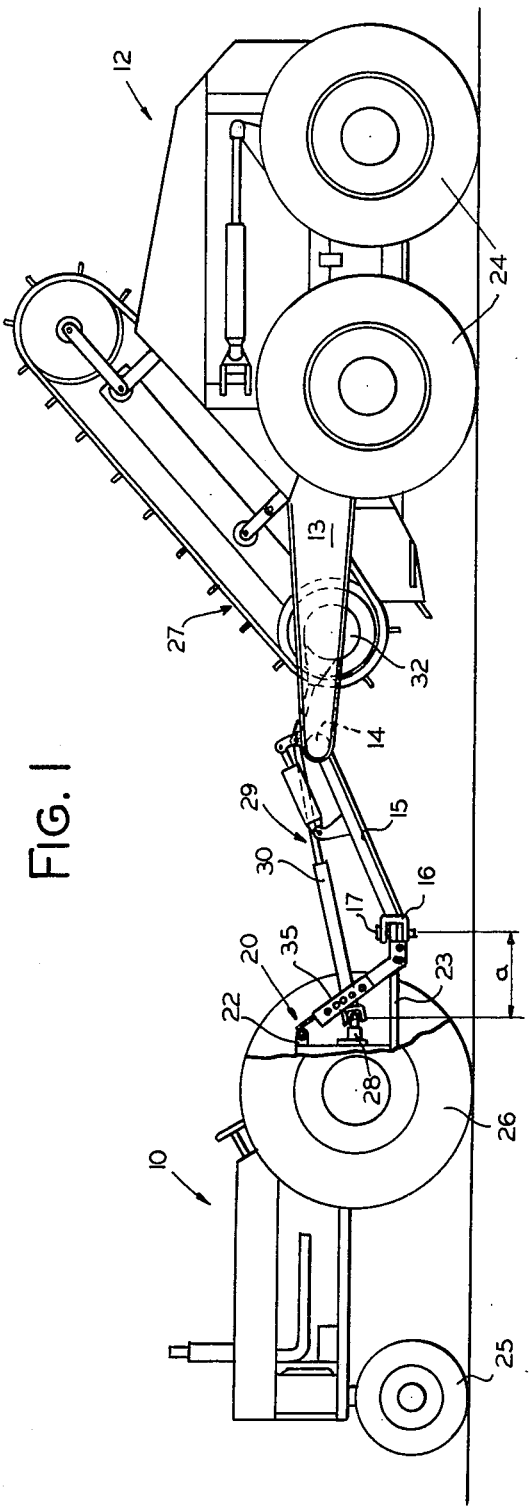
FIG. 1 is a side elevational view of an agricultural tractor and scraper with a portion of the tractor wheel cut away showing the tractor hitch, PTO shaft and hitch adapter.

FIG. 1 shows an agricultural tractor 10 towing a utility or agricultural earth-moving scraper 12. The scraper 12 has a pair of arms 13 connected at the forward end by a cross beam 14 at the center of which is attached a tongue 15 which extends forwardly for mounting on the tractor 10 by means of a clevis 16 and kingpin 17. A tractor three point hitch 20 has an upper arm forming an upper draft mounting 22. The lower draft mounting for kingpin 17 is on the draw bar 23 of the tractor. This will ordinarily have a rectangular cross section with a kingpin opening or perhaps a series of spaced openings for receiving the kingpin 17. The lower draft mounting or draw bar 23 may also be longitudinally adjustable relative to the upper draft mounting 22 by means, not shown, provided on the tractor.

Figure 2:
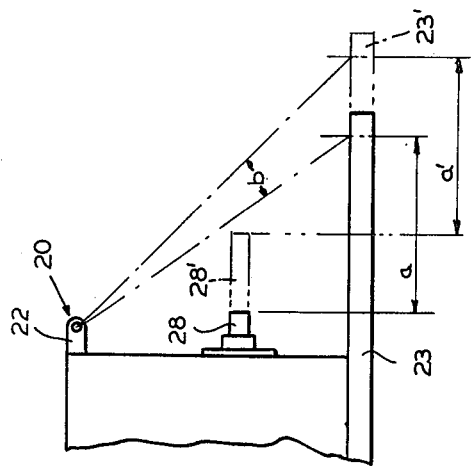
FIG. 2 is a diagrammatic representation of a universal application of the hitch adapter to various tractor hitch and PTO shaft arrangements.

The tractor 10 is supported on four wheels 25, 26 and the scraper 12 on wheels 24. The scraper is dependent upon the tractor for mobility. The scraper 12 also includes power driven components such as the elevator 27 which are dependent upon the tractor for power. In this connection the tractor will have a PTO shaft 28 which is connected by a drive line 29 having a variable length telescoping section 30 to an input gear box 32 at the foot shaft of the elevator 27. When coupled together, the tractor 10 and scraper 12 will articulate or pivot about the kingpin 17. A distance "$a$" between the end of the tractor PTO shaft 28 and the axis of the kingpin 17 is fixed according to the requirements of the variable length section 30 encountered when telescoping during turning movements. The distance "$a$" is measured with the tractor 10 and scraper 12 in straight ahead, aligned relationship. Of course, as depicted in FIG. 2, the hitch specifications will vary from tractor to tractor. In one case, the end of the PTO shaft 28 will be the required distance "$a$" from the kingpin axis while in another case the PTO shaft 28', shown by dot dash lines, will be longer and require the kingpin axis to be shifted a corresponding amount, as shown in dot dash lines, so that the fixed length "$a'$" between the end of the PTO shaft and the kingpin axis is maintained.

In addition the upper arm 22 of the three point hitch is not at a uniform spacing from the draw bar which, if course, changes the geometry of the upper and lower draft mountings as a function of the angle "$b$" and depicted by the linear dot dash lines in FIG. 2 extending from the arm 22 to the kingpin axis in the positions at 23 and 23'. Because of the necessary linear adjustments, an angular adjustment is also required as described below to maintain the lower draft coupling in a horizontal plane.

It will be appreciated that in U.S. Pat. No. 3,090,139, to which earlier reference was made, an agricultural tractor hitch arrangement is disclosed for towing an earth moving scraper having an elevator which is driven from the PTO shaft of the tractor by a telescoping drive line. The problem of maintaining a fixed distance between the end of the PTO shaft and the kingpin was, of course, present there, but no attempt was made to involve the three point hitch as a load carrying member or as one of the draft elements.

According to the present invention, a hitch adapter 35 (FIG. 1) is connected between the upper draft mounting or arm 22 and the lower draft mounting or draw bar 23.

Because of the varying geometry problems discussed above it is necessary to provide both for linear and angular adjustments. To utilize the PTO shaft, there must be no interference directly to the rear. The hitch adapter 35 is constructed to provide these requirements within the needs of most agricultural tractors. Thus, the present invention is primarily a structural reinforcing addition to existing tractor hitches enabling larger draft loads to be towed, as well as greater carrying capacities, having a universal application at least to those agricultural tractors of current manufacture suitable for towing an agricultural scraper.

Referring now to FIG. 3 the hitch adapter 35 is comprised of an upper section 37 and a linearly adjustable lower section 38. The upper section 37 has a pair of spaced legs 39 joined at the top by a cross member 40 above the PTO shaft. A bushing 41 pivotally connects the upper section to the upper draft mounting or arm 22 of the tractor three point hitch. The lower yoke section 38 has spaced legs 42 which overlap with the upper yoke section legs 39 and are formed inwardly at 43 below the PTO shaft, then downwardly at 44 and horizontally at 45 lying on opposite sides of the draft mounting or draw bar 23 as shown in FIG. 1. The horizontal lower leg portions 45 cooperate with bracket plates 46, 47 which assemble on the top and bottom of the draw bar to form an angularly adjustable draft coupling, which with the draw bar in the center, will receive the scraper clevis 16 on either side and the kingpin 17. One aspect of this arrangement is that the space between the legs 39, 42 is wide enough to accommodate the swinging movement of the telescoping drive line.

The linearly adjustable feature of the hitch adapter is provided by the arrangement where the yoke legs 42 overlapped with the yoke legs 49 and a series of holes 48 permit the lower section 38 to be adjusted downwardly or upwardly and secured at the proper length by bolts 49.

Once the proper length is established the bracket plates 46 and 47 may be assembled above and below the draw bar 23. It is significant to note that the bracket plates 46, 47 are identical and the description with respect to the bracket 46 will be understood as applying equally to the bracket 47. The bracket 46 includes spaced side plates 50 joined by web 51 offset toward the draw bar 23. A plate extension 52 overlies the draw bar. Hole 53 in the extension receives the kingpin. The side plates 50 each have a vertical slot 55 and a hole 56 offset in the opposite direction with respect to the web 51. When the bracket plate 46 is assembled on the top and the bracket plate 47 on the bottom of the draw bar 23, the latter element is reversed with respect to the former such that the webs are offset in close, if not engaging, position with the opposite sides of the draw bar 23. The vertical pair of slots 55 of the bracket plate 46 will intersect with a longitudinally upwardly inclined pair of slots 58, one in each leg portion 42. The holes 56 of the bottom bracket plate will be aligned with holes 60 in the leg portions 42 while the slots 55 will be aligned with holes 62. Thus, after the linear adjustment is made, the bracket plates 46, 47 are angularly adjusted about the transverse pivot axis of the holes 60 owing to the movement permitted by the slots 55, 58 in the upper bracket above the draw bar and the slot and hole arrangement 55, 62 of the lower bracket below the draw bar so as to maintain the horizontal relationship of the webs and extensions 51, 52 with the draw bar 23.

One aspect of the invention is that the bracket plates 46, 47 are reversible such that if one has greater wear than the other, such as the top plate, they may be reversed owing to their identical construction, with the top being placed on the bottom and the bottom on the top, the wear being uniform thereby and extending the service life of the hitch adapter.

While alternate embodiments of my invention have been disclosed, it will be understood that these descriptions are for purposes of illustration only and that various modifications and changes can be made to my invention without departing from the spirit and scope of it. Therefore, the limits of my invention should be determined from the following appended claims.

What is claimed is:

1. A hitch adapter for a tractor vehicle having hitch means on the rear for towing an implement including an upper draft mounting and a lower draft mounting and a power take-off means between the two draft mountings adapted to drive an auxiliary unit being towed by the tractor hitch means, the hitch adapter having spaced leg portions being extendable generally downwardly and rearwardly between said upper and lower draft mountings providing a plurality of linearly adjusted positions, a draft coupling means including spaced plates adjacent the leg portions, and adjustment means including spaced, transversely aligned openings in said leg portions and plates, the one containing a pair of slots in aligned relation with openings in the other permitting the draft coupling means to be angularly adjustable on a transverse axis adjacent the lower end of said leg portions to a position corresponding to one of the linear positions of said leg portions adjusted to a position for maintaining the auxiliary unit in substantially the same relation to the power take-off means for one tractor hitch as for another whereby said hitch adapter permits said auxiliary unit to be coupled to different tractors.

2. A hitch adapter according to claim 1 wherein there is a first section comprising a pair of spaced leg portions, a cross member connecting the leg portions at the upper end and connected to said upper draft mounting of the tractor hitch, a second section comprising spaced leg portions extending in overlapping relationship with the respective leg portions of the first section and fastener means connecting each in overlapped relationship.

3. A hitch adapted according to claim 2 wherein the draft coupling means comprises spaced side plates adjacent the leg portions pivotally connected at the lower end of said second section by means including a pair of longitudinally extending slots one in each leg portion, inclined upwardly relative to a generally horizontal plane.

4. A hitch adapter according to claim 3 wherein the draft coupling means includes a pair of bracket elements, each having spaced side plates joined by a web, said side plates having transversely aligned openings coinciding with openings at the lower end of said leg portions of the second section defining a transverse pivot axis, which permits limited angular adjustment of the bracket elements.

5. A hitch adapter according to claim 4 wherein the web of each bracket element is offset toward a common intermediate horizontal plane and said openings are offset in the opposite direction whereby said bracket elements are reversible top to bottom on opposite sides of said plane.

6. A hitch adapter according to claim 5 wherein each said web has a generally horizontal extension containing an opening alignable in a vertical axis with an opening in said lower draft mounting for receiving a kingpin of an implement to be towed by said tractor.

7. A hitch adapter according to claim 6 wherein the transversely aligned openings in the side plates of the top bracket element includes vertically extending slots, one in each side plate, overlying the inclined slots in the lower ends of the leg portions.

* * * * *